F. J. BRUNELL.
MACHINE FOR MAKING PAPER PAILS.
APPLICATION FILED AUG. 8, 1913.
1,153,193.
Patented Sept. 14, 1915.
13 SHEETS—SHEET 1.
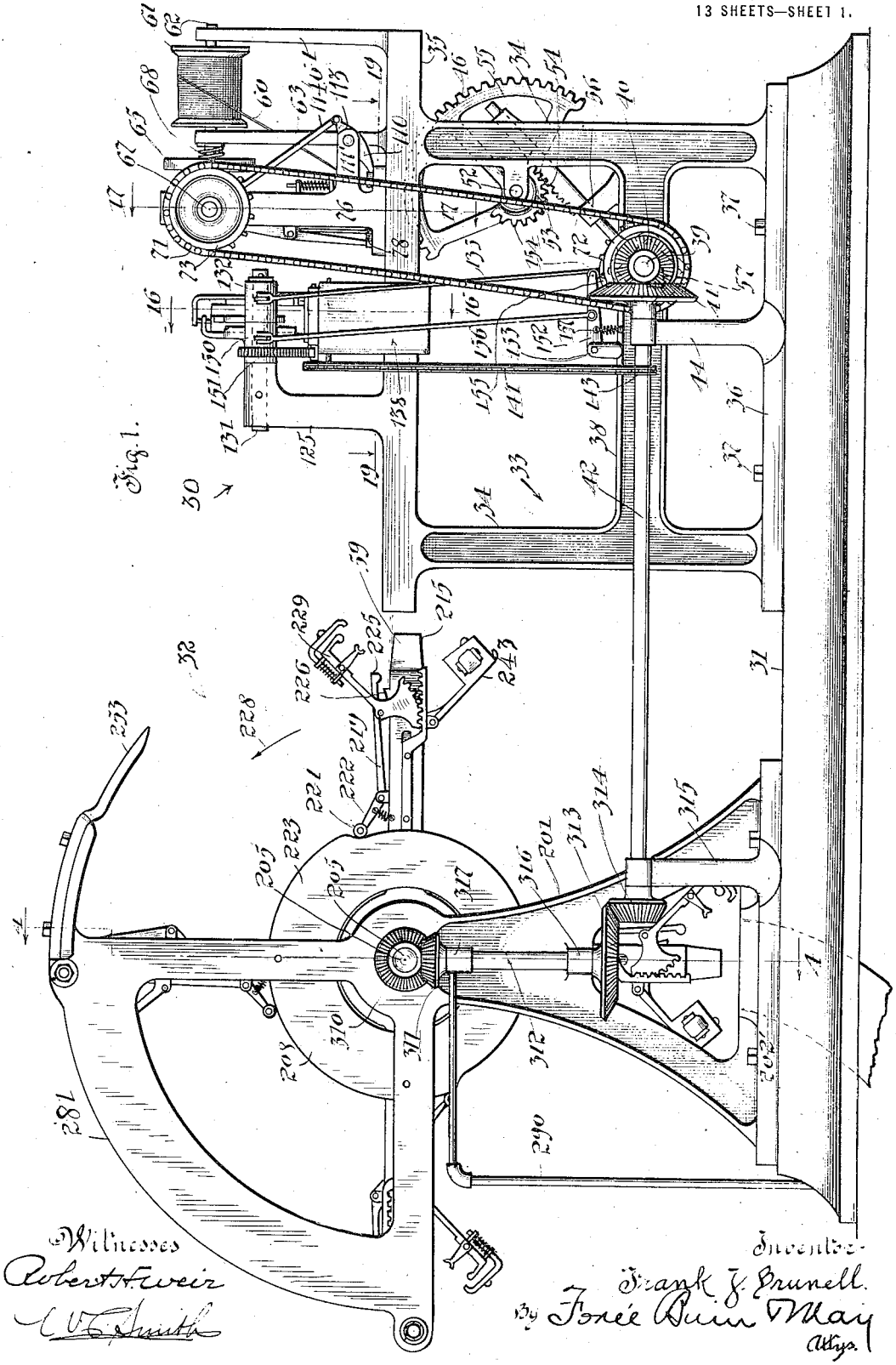

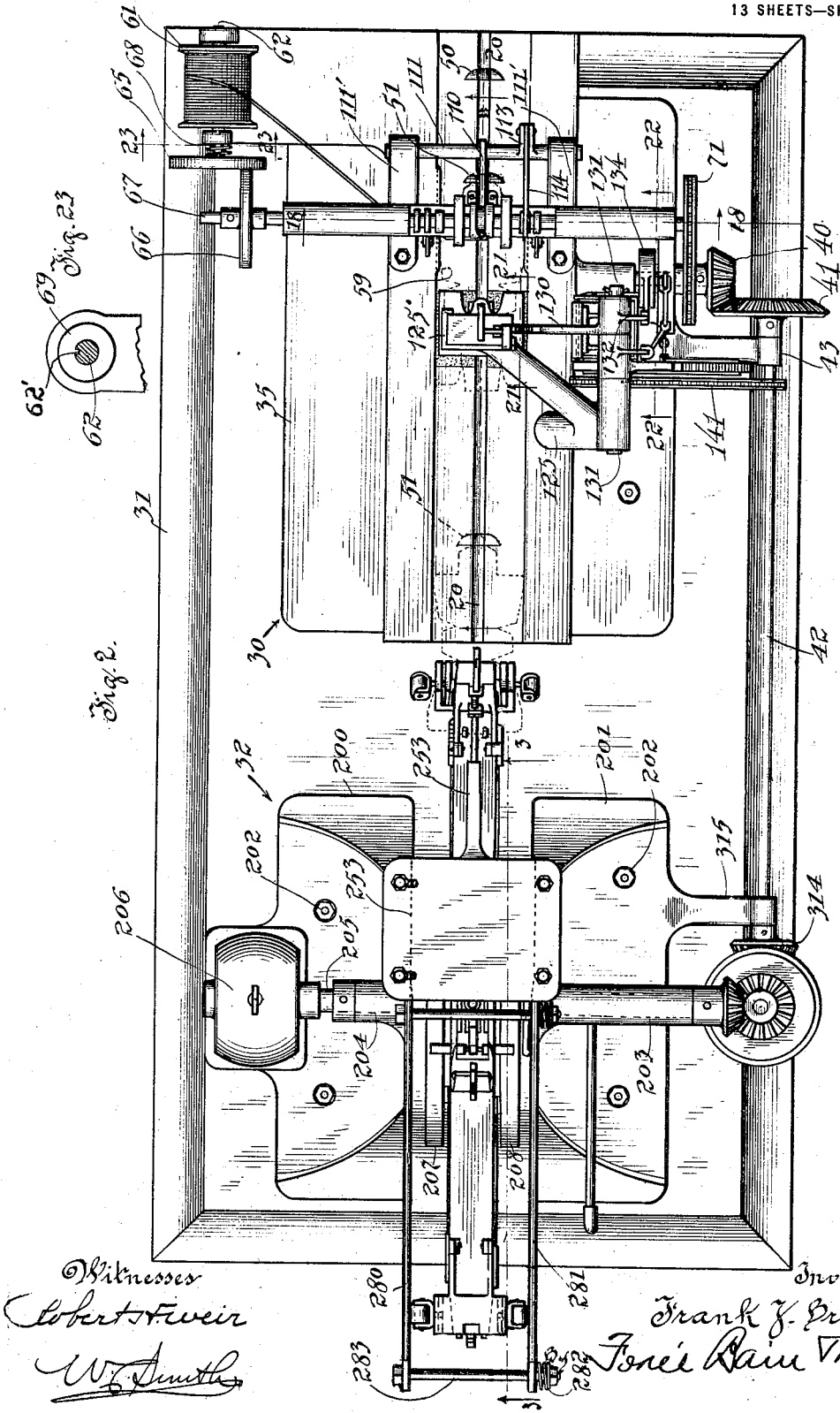
F. J. BRUNELL.
MACHINE FOR MAKING PAPER PAILS.
APPLICATION FILED AUG. 8, 1913.
1,153,193.  Patented Sept. 14, 1915.
13 SHEETS—SHEET 2.

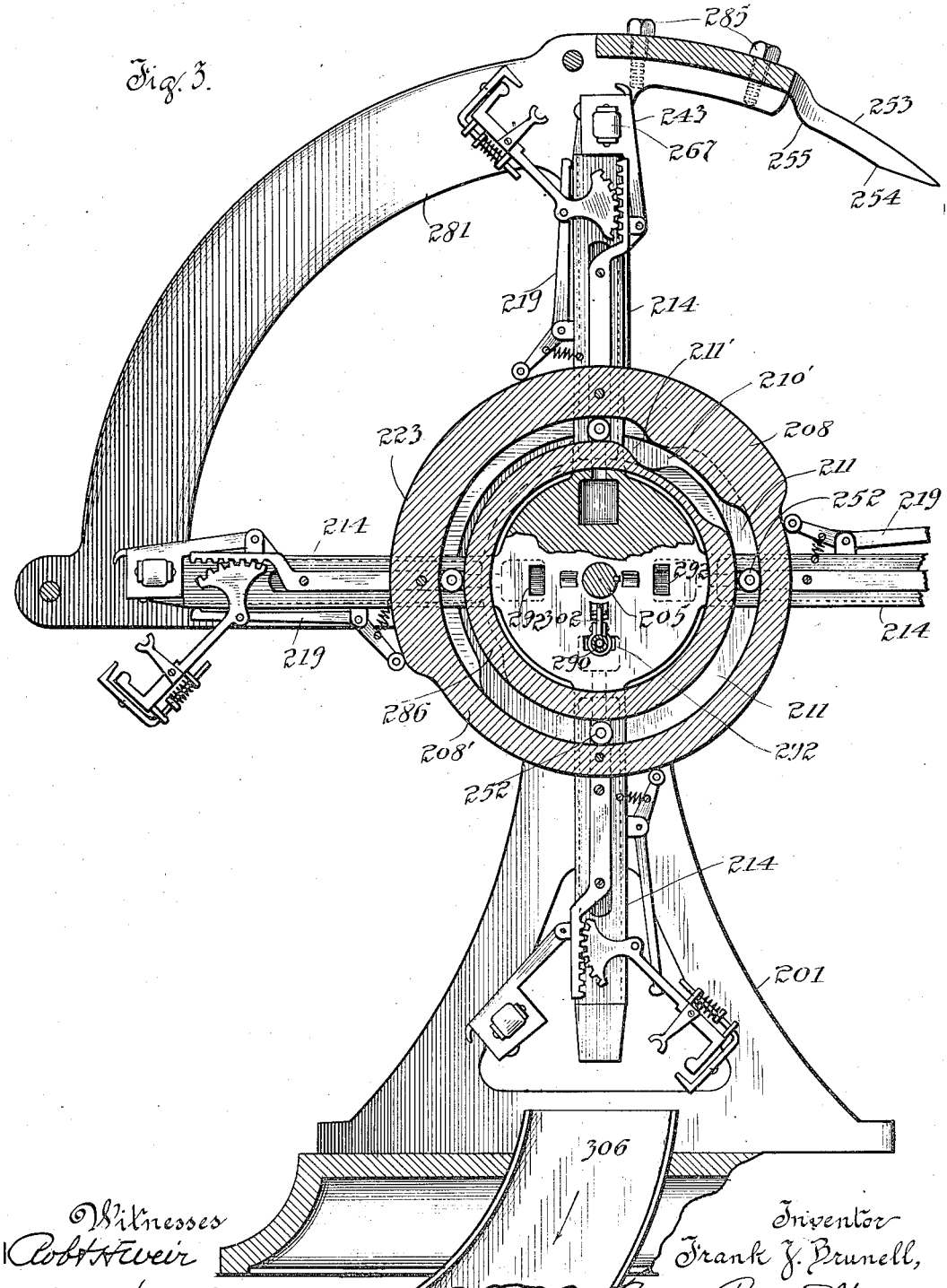

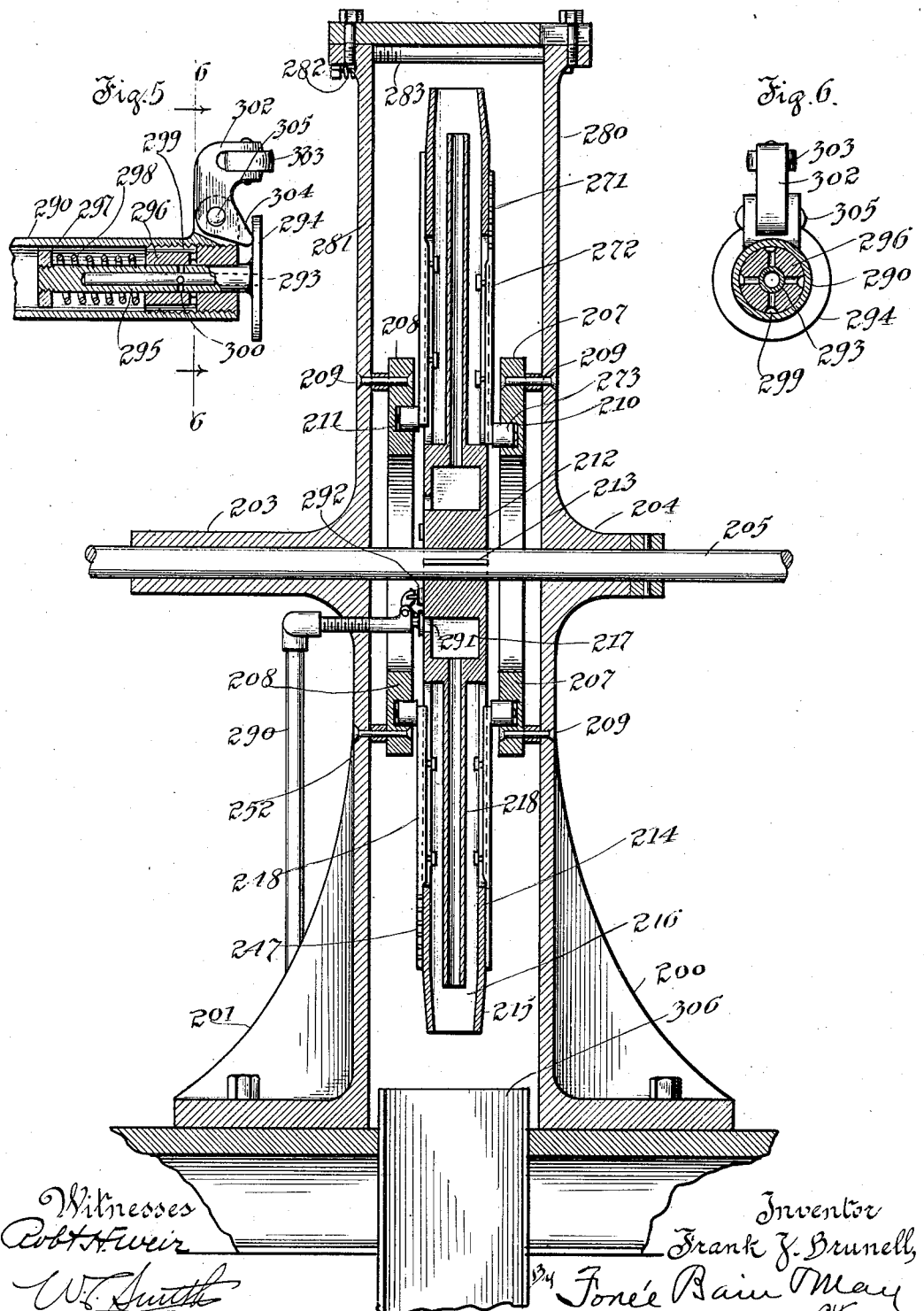

F. J. BRUNELL.
MACHINE FOR MAKING PAPER PAILS.
APPLICATION FILED AUG. 8, 1913.
1,153,193.
Patented Sept. 14, 1915.
13 SHEETS—SHEET 5.
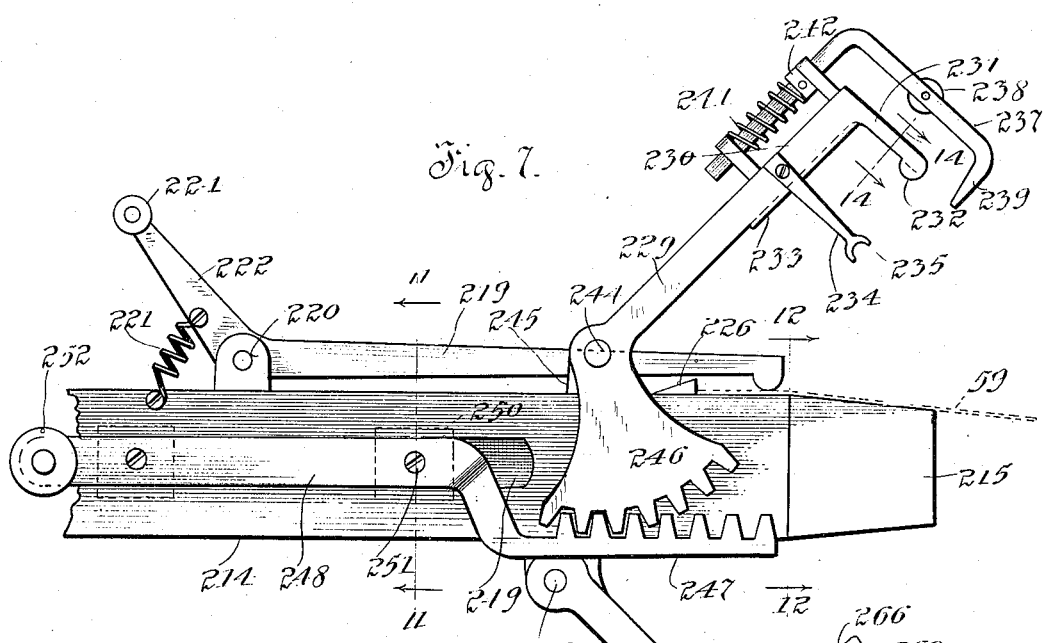
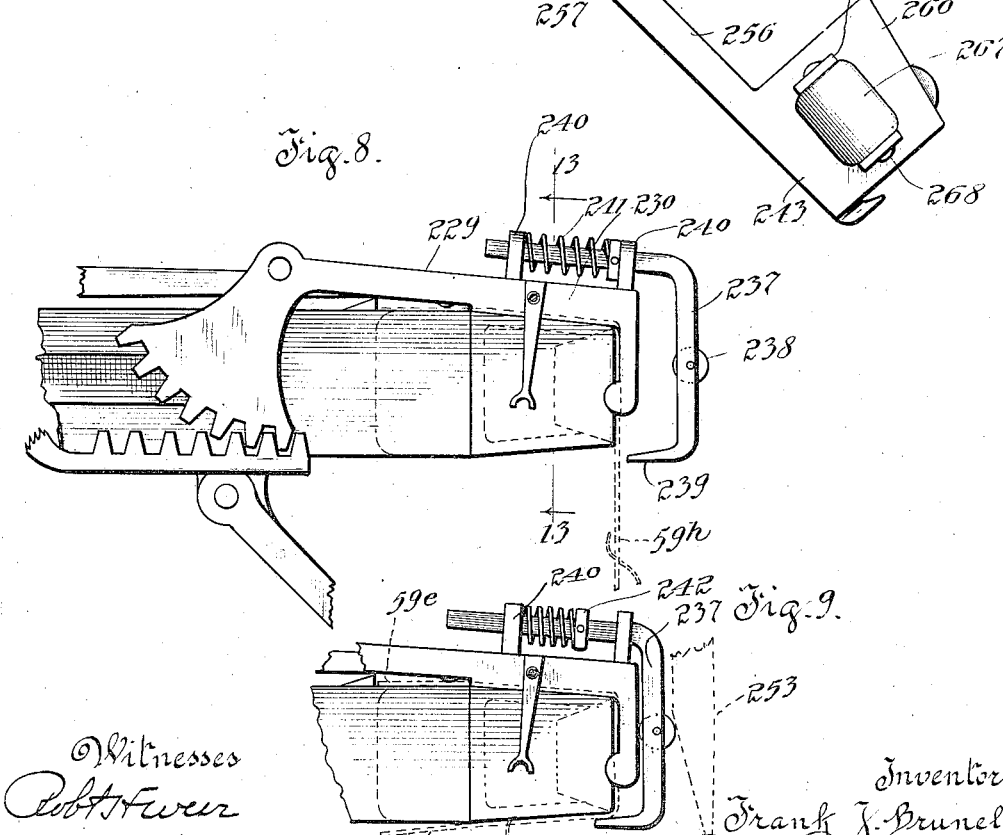

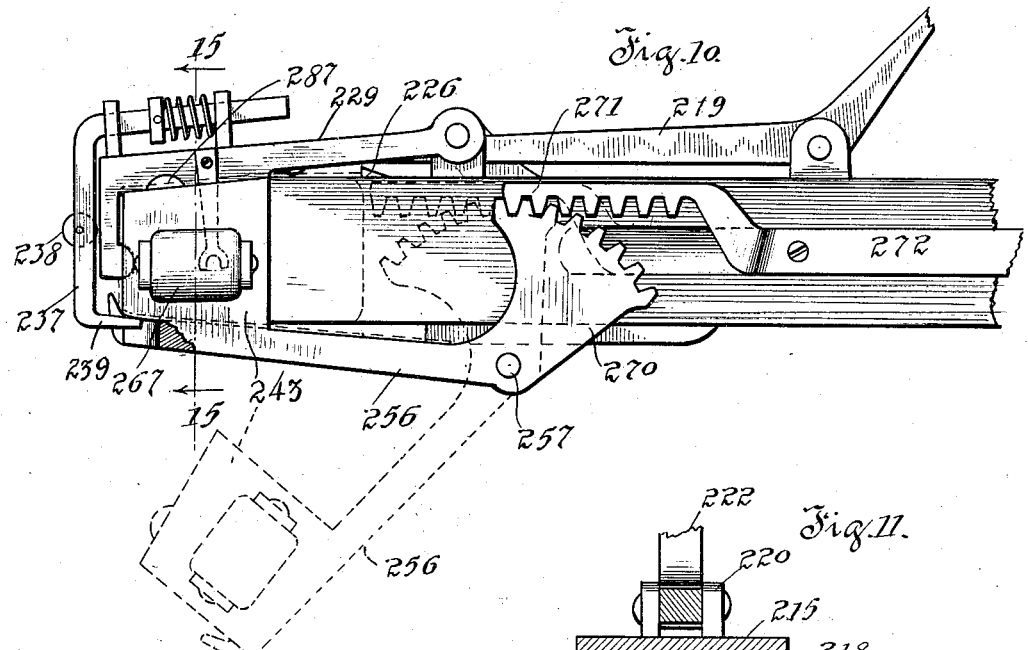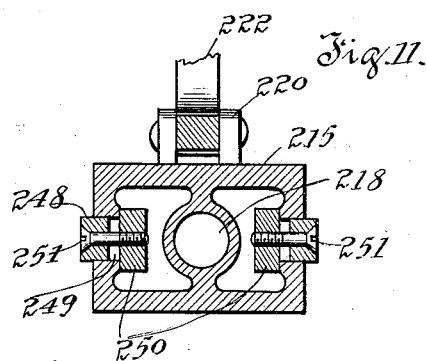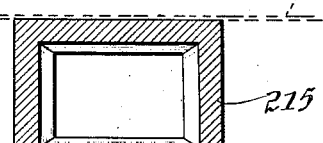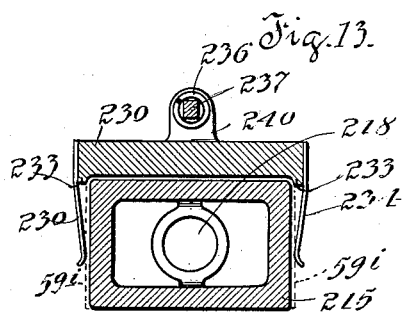

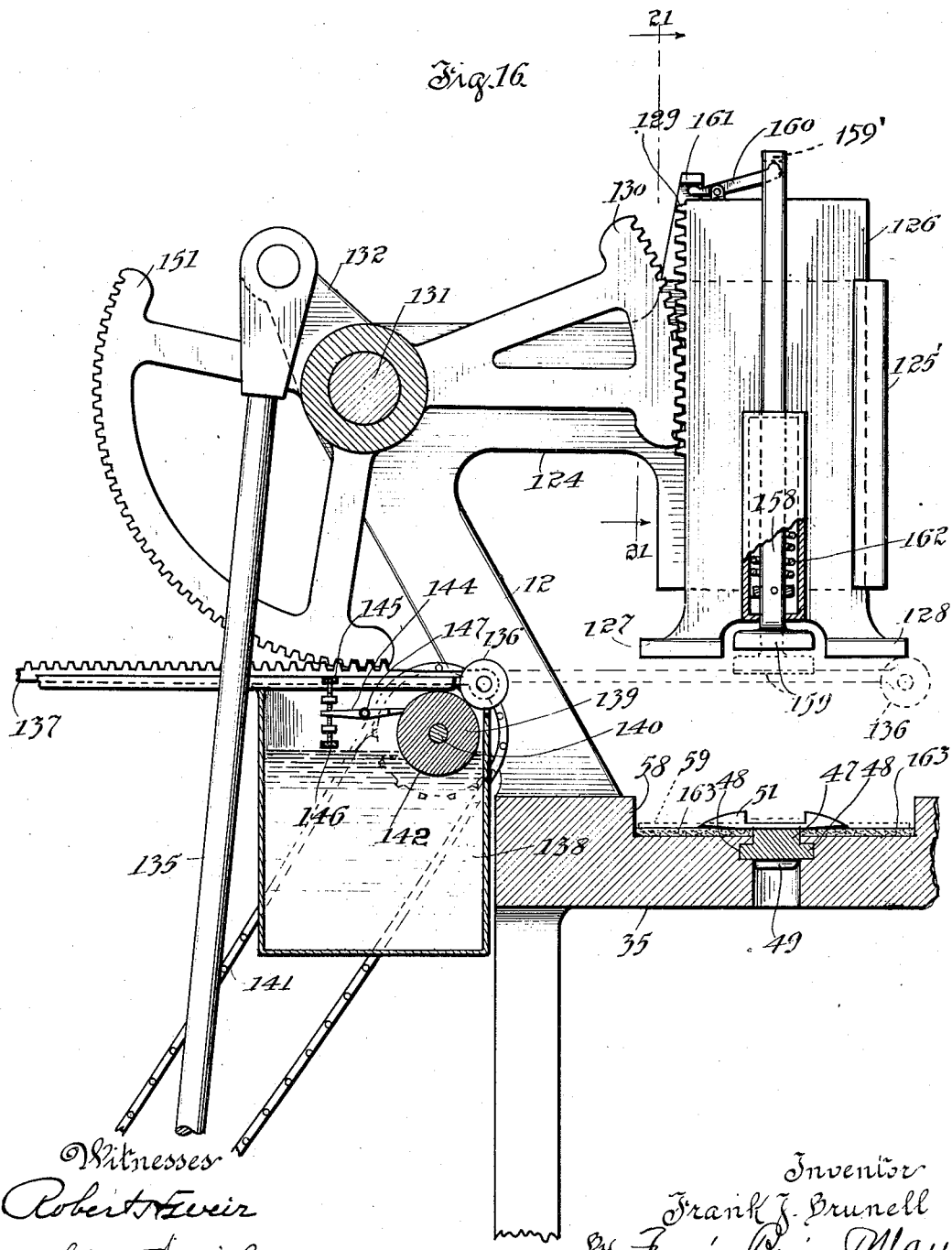

F. J. BRUNELL.
MACHINE FOR MAKING PAPER PAILS.
APPLICATION FILED AUG. 8, 1913.
1,153,193.
Patented Sept. 14, 1915.
13 SHEETS—SHEET 8.
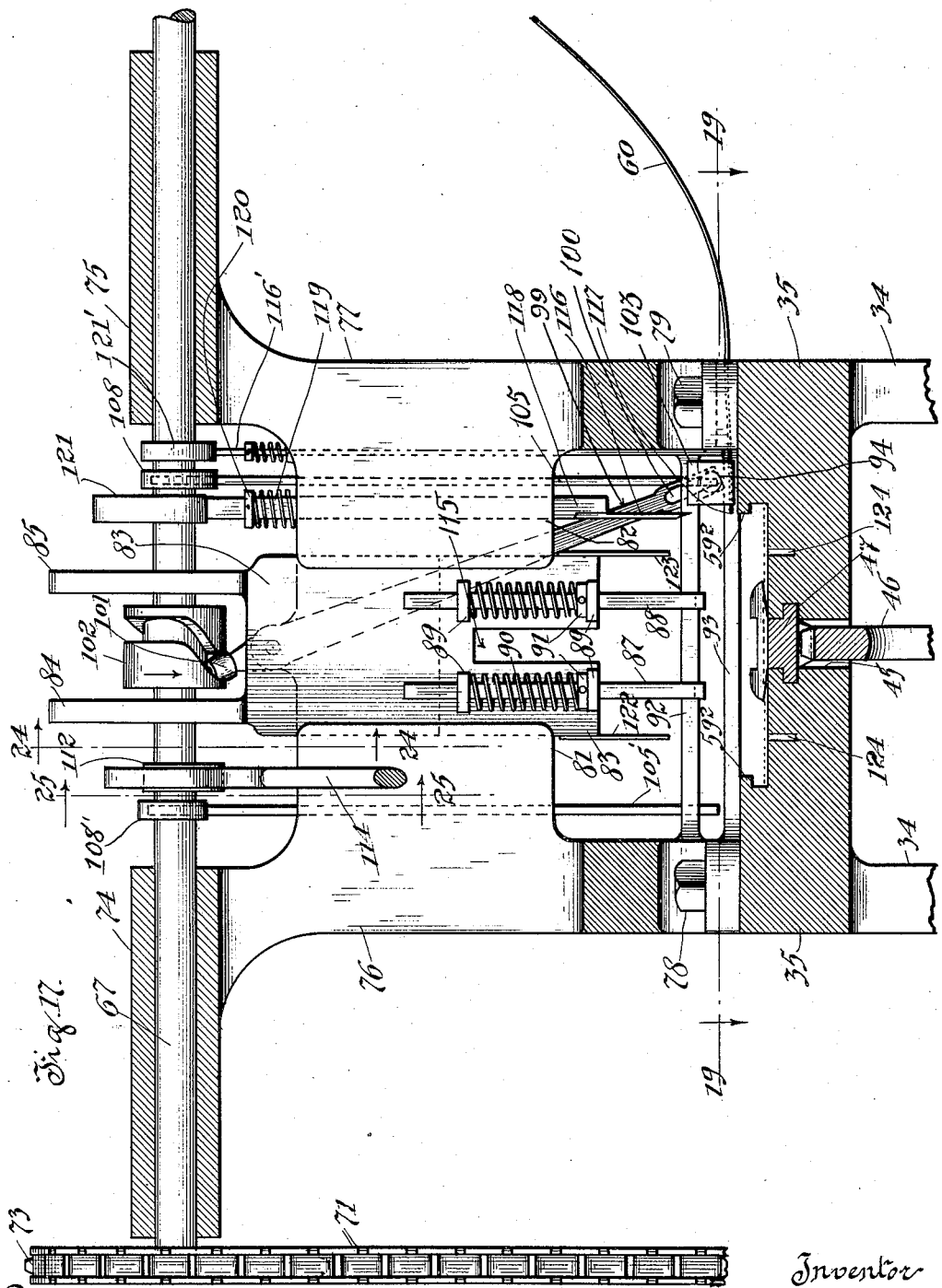

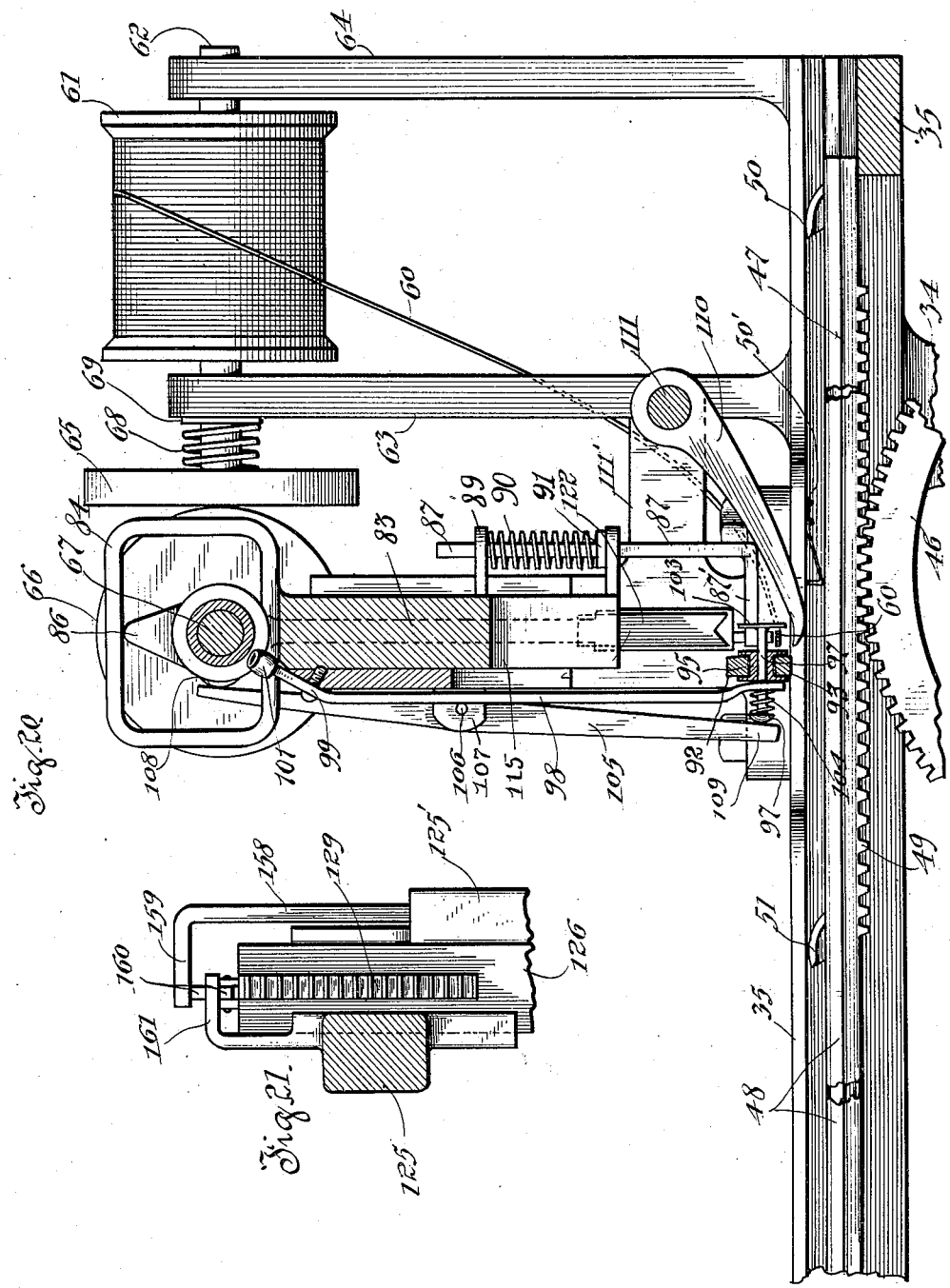
F. J. BRUNELL.
MACHINE FOR MAKING PAPER PAILS.
APPLICATION FILED AUG. 8, 1913.
1,153,193. Patented Sept. 14, 1915.
13 SHEETS—SHEET 9.

F. J. BRUNELL.
MACHINE FOR MAKING PAPER PAILS.
APPLICATION FILED AUG. 8, 1913.
1,153,193.
Patented Sept. 14, 1915.
13 SHEETS—SHEET 10.
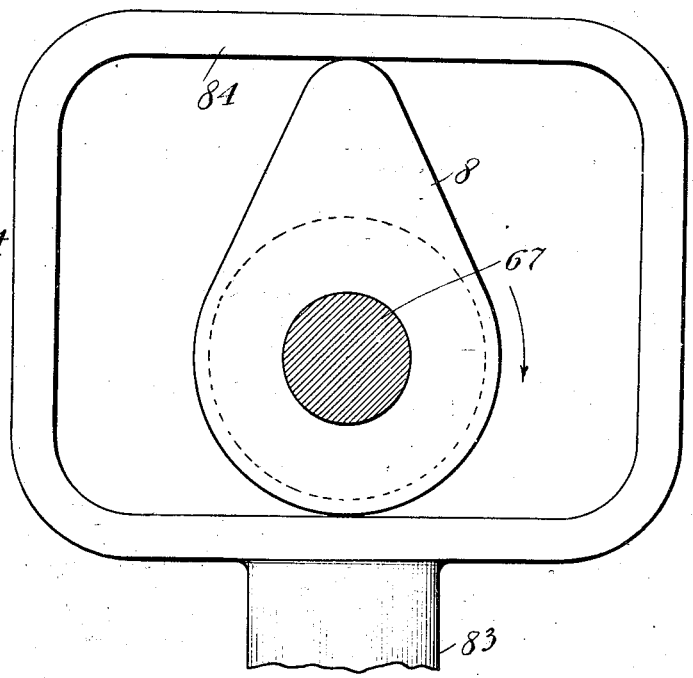
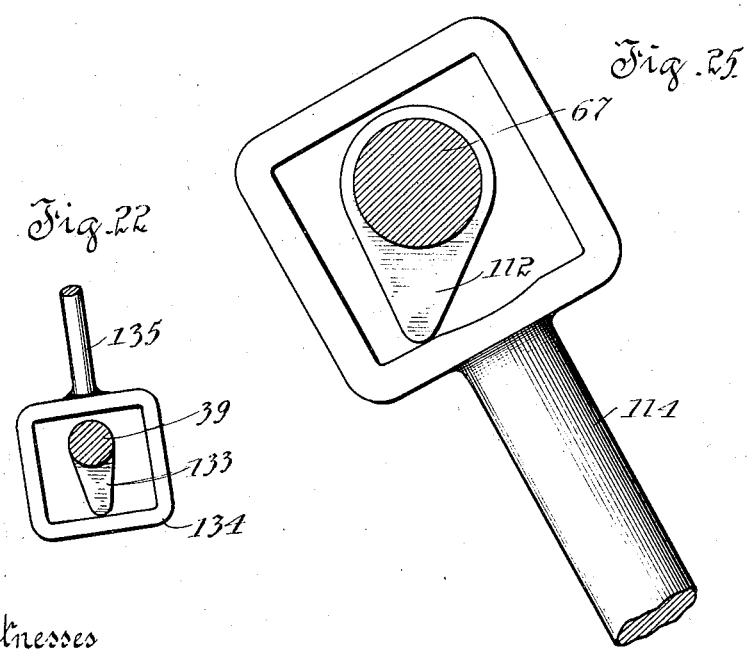

F. J. BRUNELL.
MACHINE FOR MAKING PAPER PAILS.
APPLICATION FILED AUG. 8, 1913.
1,153,193.
Patented Sept. 14, 1915.
13 SHEETS—SHEET 11.
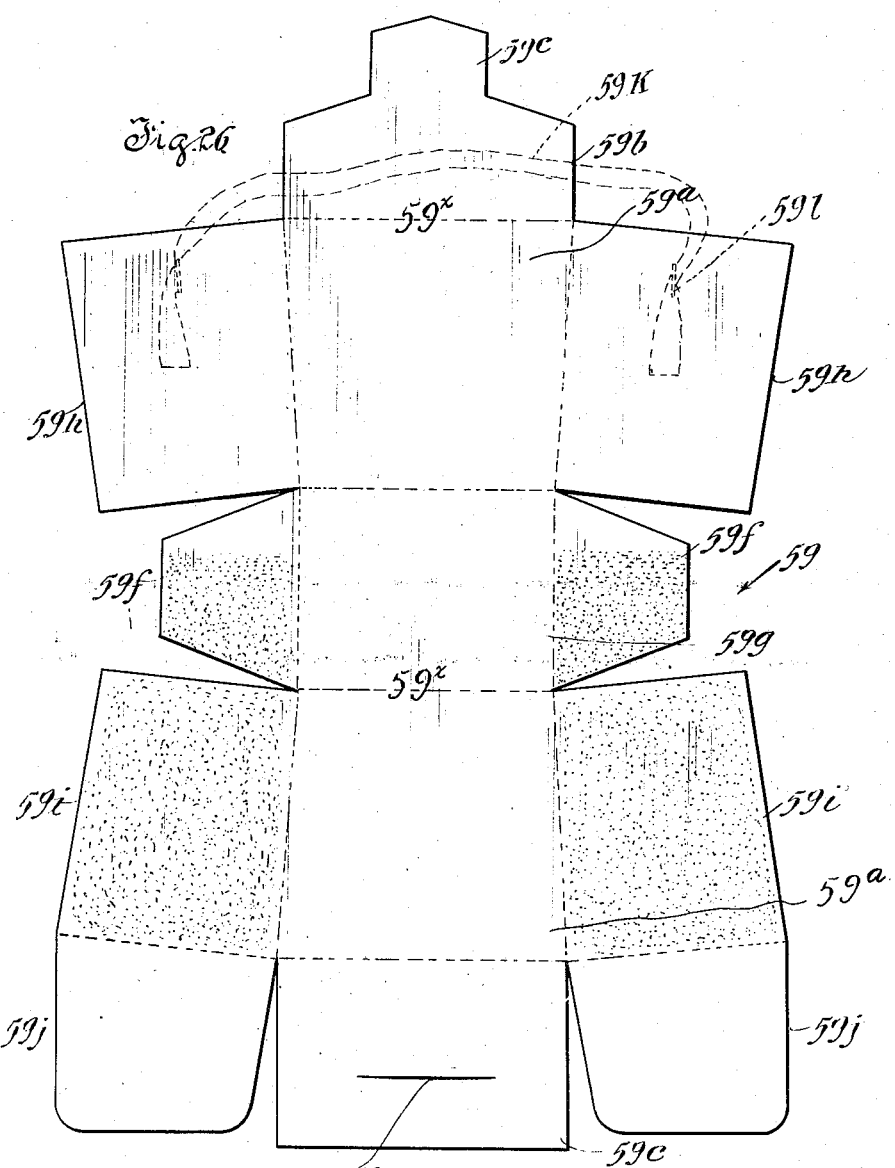
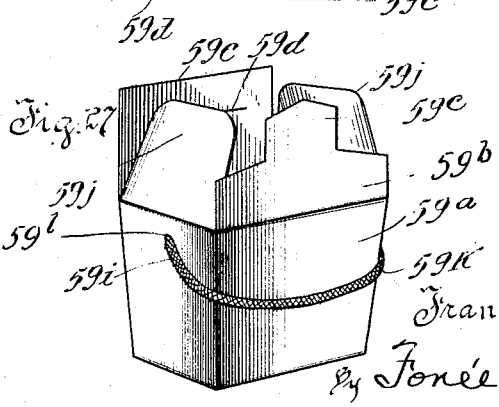

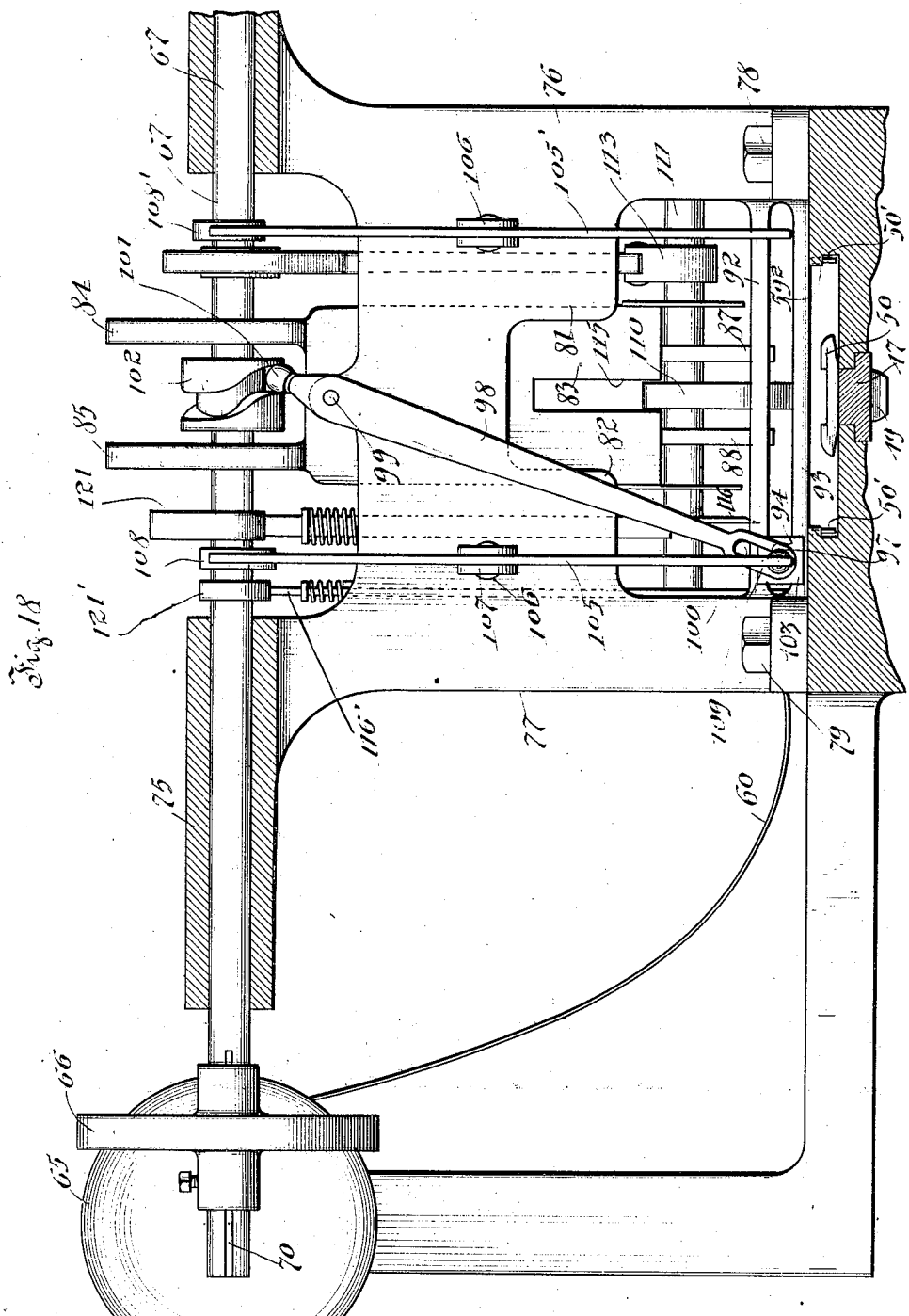

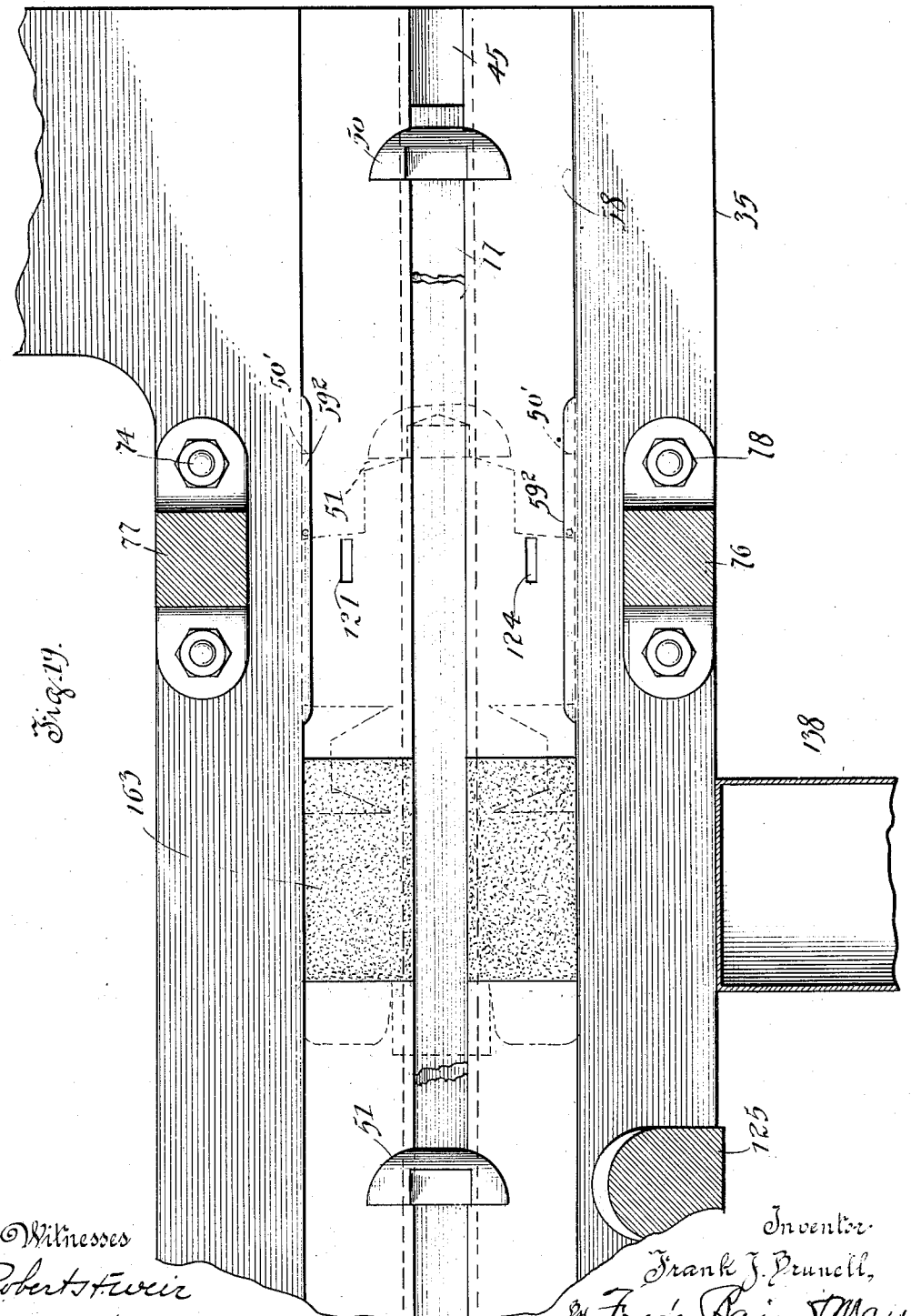

UNITED STATES PATENT OFFICE.

FRANK J. BRUNELL, OF CHICAGO, ILLINOIS, ASSIGNOR OF ONE-HALF TO FORÉE BAIN, OF LA GRANGE, ILLINOIS.

MACHINE FOR MAKING PAPER PAILS.

1,153,193.     Specification of Letters Patent.      Patented Sept. 14, 1915.

Application filed August 8, 1913. Serial No. 783,697.

*To all whom it may concern:*

Be it known that I, FRANK J. BRUNELL, a citizen of the United States, residing at Chicago, in the county of Cook and State of Illinois, have invented certain new and useful Improvements in Machines for Making Paper Pails, of which the following is a specification.

My invention relates to improvements in machines for making paper pails.

One of the objects of my invention is to provide a machine for making paper pails, such as ice cream containers, which will automatically perform all the functions necessary in the construction of such receptacles after the blank, of which the pail is to be formed, has been presented to it by an attendant.

Another object of my invention is to provide a machine which has the capability to operate upon a plurality of blanks at the same time, whereby the various operations necessary for the construction may be simultaneously performed upon said blanks in their sequential progression through the machine, thereby to increase the capacity of the machine and to apportion a greater length of time to the performance of the various operations, giving the glue time to "set" and holding the glued parts, with considerable pressure, in intimate contact during the setting process.

Another object of my invention is generally to improve the construction of such machines.

More specific objects sought and advantages to be attained by my invention will be apparent to persons skilled in the art from the following description when taken in conjunction with the accompanying drawings, wherein—

Figure 1 is a longitudinal elevation of the machine, showing the pail-forming parts in position to receive a blank. Fig. 2 is a plan view of the complete machine. Fig. 3 is a longitudinal section taken on line 3—3 of Fig. 2. Fig. 4 is a transverse section taken on line 4—4 of Fig. 1. Fig. 5 is an enlarged detail view of an automatic air valve to admit air into the interior of the hollow forming mandrel to blow the completed pail therefrom. Fig. 6 is a cross sectional view of same taken on line 6—6 of Fig. 5. Fig. 7 is an enlarged detail view of one of the forming mandrels and its associate folding and clamping heads, showing the parts open ready to receive a blank and a blank in place before being folded. Fig. 8 is a similar view showing the upper folding head in place on the mandrel and two side and the end folds made thereby. Fig. 9 is a similar view showing further movement of a part of the upper folding head to deflect the depending portions of the blank, shown before deflection in dotted lines in Fig. 8. Fig. 10 is a similar view showing both folding and clamping heads in operative position with reference to the forming mandrel, and showing the lower clamping head open, in dotted lines. Fig. 11 is an enlarged transverse section taken on line 11—11 of Fig. 7. Fig. 12 is a similar section taken on line 12—12 of Fig. 7. Fig. 13 is a similar section taken on line 13—13 of Fig. 8. Fig. 14 is a similar section taken on line 14—14 of Fig. 7. Fig. 15 is a similar section taken on line 15—15 of Fig. 10. Fig. 16 is a similar section taken on line 16—16 of Fig. 1. Fig. 17 is a similar section taken on line 17—17 of Fig. 1. Fig. 18 is a similar section taken on line 18—18 of Fig. 2. Fig. 19 is a similar section taken on line 19—19 of Figs. 1 and 17. Fig. 20 is an enlarged longitudinal section taken on line 20—20 of Fig. 2. Fig. 21 is a similar section taken on line 21—21 of Fig. 2. Fig. 22 is an enlarged section of a detail taken on line 22—22 of Fig. 2. Fig. 23 is a similar section of a detail taken on line 23—23 of Fig. 2. Fig. 24 is an enlarged section of a detail taken on line 24—24 of Fig. 17. Fig. 25 is a similar view taken on line 25—25 of Fig. 17. Fig. 26 shows a plan view of a blank of which the pail is to be made and before it is folded. Fig. 27 is a perspective view of the completed pail.

In all the views the same reference characters are employed to indicate similar parts.

My machine comprises a plurality of coöperating instrumentalities, driven in proper time relation to perform their respective functions.

The mechanism 30, on the right hand side of the base 31, receives a blank, of which the pail is to be subsequently formed; attaches the tape thereto, to form the handle or bail; applies the paste or glue to appropriate walls of the blank that are to be joined; and feeds the blank, thus prepared, in proper order to the folding machine 32, located on the left hand side of the base 31.

The folding machine, or apparatus, receives the taped and glue-applied blanks from the taper and paster; folds the blank in proper manner around a bodily rotating forming mandrel; applies pressure to the contacting paste or glue laden parts and parts to be united and subsequently blows the completed pail from the respective mandrels into nested relation with similar previously completed pails.

I will first describe the blank-receiving, paste-applying and taping apparatus and subsequently describe the folding apparatus and its relation to the former.

A frame 33 having legs 34 supports a table 35 and is provided with a base 36 that is secured to the sub-base 31 by means of cap screws 37. Cross bars 38, between the legs 34, provide bearing supports for the main drive shaft 39. This shaft has secured thereto a beveled gear wheel 40 which is driven by a coöperating beveled gear wheel 41, secured to the horizontal shaft 42, the proximate end of this shaft finding bearing in the bracket 44. The shaft 42 is the means by which the mechanism of the taping and pasting or glueing machine is driven.

The table 35 is longitudinally slotted, as at 45, to admit a geared segment 46 designed to intermittently drive a longitudinally reciprocatable blank-feeding bar 47. The bar 47 is provided with longitudinal, transversely projecting ribs 48, that fit into recesses made in the side walls of the longitudinal slot for accommodation of the said bar, so as to prevent the bar from moving out of said slot. The lower surface of the bar is provided with a longitudinally extending rack 49 which may be integral with the said bar or may be attached thereto, but is designed for intermeshing gear relation with the segment 46 whereby said feed bar is reciprocated. At the rear end of the feed bar 47 is a tapered blank-moving ear 50 located on the said bar. At a point remote from the ear 50, and in advance thereof is a similar ear 51 the distance between said ears being substantially equal to the greatest length of the blank of which the pail is to be made. The feed bar 47 is to be reciprocated, in proper time relation to the number of revolutions of the driving shaft 42. For accomplishing this result a gear segment 46 is pivoted, as at 52, and is provided also on its shorter end with a gear segment 53 that meshes into a reciprocatable rack 54. The reciprocatable rack-bar 54 has bearings in the frame as at 55 and 56, and terminates at its operative end in a substantially rectangular cam frame such as that shown in Fig. 25, in coöperation with a cam 57 that is secured to the shaft 39, so that when the shaft 39 is rotated a full revolution, the rack bar 54 will be reciprocated the full excursion of its movement thereby oscillating gear segment 46 to reciprocate the feed bar 47, so that for every revolution of the shaft 39 the feed bar 47 will be caused to make one complete reciprocation, dwells intervening between its forward and backward excursions. One ear, 50, feeds the inserted blank forward to the paster and threader, where it is held against reverse movement by a spring detent or latch 50′, (Fig. 20) so that when the bar 47 recedes the other ear 51, passing beneath the blank engages the rear end of the blank for the purpose of feeding said blank to the folder on the next forward excursion of the feed bar 47.

A suitably-wide depression or channel 58 is cut into the face of the table 35 and extends longitudinally thereof to provide guiding means for the blanks which are to be fed into the folding machine by the reciprocatable feed bar 47. In Fig. 16 the blank 59 is shown in dotted lines in its position within said depression.

The blank 59 contains a central member $59^x$ which is subsequently to form two sides, $59^a$, the bottom and top of the completed pail. The top is to be composed of the flap $59^b$ with a projecting tongue $59^c$, the flap $59^e$ and a coöperating slot $59^d$ for the tongue. The glue receiving tabs $59^f$ are to be vertically extended above the bottom $59^g$ and in the completed pail they will be included between the overlapping end forming members $59^h$ and $59^i$. The tape bail, or handle $59^k$, is threaded through slots $59^l$ made by the machine in the member $59^h$ before the blank is folded to form the pail, the ends of the tape being glued and held between said wings at the time when these members are pressed together by a subsequently described operation.

At the proper position on the table 35, in rear of where the blank is to receive its glue, overhanging projections $59^z$ are secured to or are parts of the side walls of the channel 58 to prevent the edges of the blank from rising when the perforators which pass the tape through the blank are being withdrawn from their operative positions.

By referring to Fig. 2 it will be observed that the feed-bar 47 is broken, indicating that it is to be longer, the normal position of the ear 50 on said feed-bar being displaced somewhat to the right hand side, sufficiently to permit the insertion of a blank 59 between the ears 50 and 51. At this time the segment 46, which reciprocates the feed bar, is in such position as to be capable of reciprocating the feed bar to the left to the full extent of its movement, which will cause the blanks 59 to rest in the positions shown in dotted lines in Fig. 2, where one is located immediately below the tape-applying mechanism and the glue-applying mechanism, which I will now describe.

A tape 60 is contained upon a reel, or spool, 61, secured to an arbor 62 that finds bearing in the standards 63 and 64 that arise from the table 35. On the end of the arbor 62 is a friction disk 65 adapted to be driven by an angularly-disposed disk 66 secured to the shaft 67. In order to effect constant but yielding frictional contact between the two disks I provide a spring 68 which surrounds the shaft 62 and bears against the friction disk 65 and against a collar 69 that is on the shaft 62. The shaft 62 is provided with a spline 62′ (Fig. 23) in which engages a tongue from the collar 69 so as to positively rotate said collar with the shaft and disk so that frictional engagement is not made between the spring 68 and the standard 63 but is taken by the collar 69 and there is no relative movement between the collar 69, the spring 68 and the disk 65. The object of driving the reel or spool 61 is to unwind the tape so that the tape moving mechanism may not be restrained by any friction interposed by the movement of the spool or reel 61. The speed at which the spool 61 may be rotated is adjustable by movement of the friction wheel 66 on the shaft 67 along the radius of the wheel 65. The shaft 67 is provided with a spline 70 and the wheel 66 is provided with a feather that effects rotative engagement between said shaft and wheel but permits longitudinal movement of the latter thereon.

The shaft 67 is driven by a chain 71 from the shaft 39. Said chain extends from the sprocket wheel 72 of the shaft 39 to the sprocket wheel 73 on the shaft 67, so that the speed of the shaft 39 and shaft 67 are substantially equal. The shaft 67 has bearings 74 and 75 in the standards 76 and 77 respectively. These standards are fixed to the table 35 by means of cap-screws 78 and 79, respectively.

Transverse extensions 81 and 82 project inwardly from the standards 76 and 77, respectively, to provide bearings for certain operative instrumentalities. A reciprocatable head 83, (Fig. 17) finds bearing between the extensions 81 and 82 and is provided with two cam-yokes 84 and 85 in which a cam 86, connected to the shaft 67, is revolved, there being one cam in each of said yokes. From a consideration of the cam structure, shown in Fig. 24, it will be noticed that the head 83 will be moved downwardly where it will be permitted to dwell for a specific time, and will be subsequently moved upwardly after which latter movement there will be a dwell, and, therefore, the head 83 has a dwell of a definite time between each of its downward and upward movements by the operation of the cams.

Carried by the head 83 are two spring-pressed, vertically disposed presser foot rods 87 and 88, laterally bent at their ends to form feet 87′ and 88′, see Fig. 20, and guided through projecting lugs 89 and held downwardly by the open compression springs 90, being limited by the collar 91. When the head 83 is moved downwardly the presser feet 87′ and 88′ bear upon the blank 59, which is then immediately below the head 83. These pressure feet serve to hold the blank in stable position while it is being operated upon by other devices hereinafter described.

Between the parallel bars 92 and 93 is a reciprocatable, tape-moving head 94. This head engages the end of the tape 60 and moves it transversely across the blank for insertion therein. The head consists of a body part 95 which is in guiding contact with the bars 92 and 93, and which is perforated for a stem 97. A lever 98, pivoted as at 99, and slotted as at 100, engages said stem 97 to move the head. The upper end of the lever 98 is provided with a roller 101, which engages a sinuous cam 102, carried on the shaft 67. The arrangement of the cam 102, is such that at each revolution of the shaft 67 the head 94 is moved across the top of the blank to engage the tape and returned to its normal position, carrying the tape with it. The tape 60 passes through a perforation made through the base of the standard 77, and is left in position, by the cutting knife, as shown in Fig. 17, for engagement with the tape-moving head 95. The stem 97 carries on its inner end a cross bar 103, that is held normally in contact with the head 95 by means of the spring 104. When the head 95 is moved over toward the position shown in Fig. 17 by the cam 102, and when in close proximity with the end of the tape 60, the clamping mechanism, carried by the head, is opened for reception of the tape just before the head arrives at said position, in the following manner:

A lever 105 is pivoted, as at 106, to projections 107, from the standard 77. A cam 108 is secured to the shaft 67 and the upper end of the lever 105 is within the path of the cam 108, so that when the cam is brought under the upper end of the lever 105 its upper end is thereby moved laterally in an outward direction, and the lower end 109 is moved inwardly, and as the lower end 109 is immediately over the end of the stem 97 the cross bar 103, connected to the said stem is moved thereby into the position shown in Fig. 20, so as to permit the tape 60 to be included between the head 95 and the cross-bar 103. Before the head 95 starts back on its return excursion, carrying the tape 60 with it, the cam 108 has moved from under the upper end of the lever 105 and therefore the tape 60 will be clamped by operation of the spring 104 and firmly held between the cross-bar 103 and the head 95, then as the cam 102 moves the lever 98 back to its normal position the head carries the tape 60 with it. A similar lever 105' is operated by its cam 108' to release the tape from clamp 103.

It is assumed that the spool-driving mechanism has unwound a sufficient amount of tape to permit the free movement thereof without the necessity of rotating the spool by the operation of the moving head. During the return movement of the tape-carrying head the tape will be caused to pass over a pivoted slack producing finger 110, which is secured on the shaft 111, which shaft finds bearings in the rearwardly-extending projections 111' from the vertical standards 76 and 77. Before the tape is released by the head, the finger 110 is raised in order to raise the tape 60 and thereby provide sufficient slack or length of tape between the points where it contacts with the pail for a convenient bail or handle. The finger 110 is raised at this time by means of a cam 112 secured to the shaft 67 and connected to a projection 113 on the shaft 111 by means of a rod 114. The general form and arrangement of the cam 112 is more clearly shown in Fig. 25, wherein is shown the termination of the rod 114 to be of rectangular form to supply a co-acting cam-part with the cam 112. When the finger 110 is lifted a portion of it will pass up through the slot 115 in the head 83. While the finger 110 is in raised position a vertical clamp bar 116' is depressed by cam 121' to clamp the tape against the table and the vertically reciprocatable knife 116 severs the tape, as at 117 in Fig. 17. The knife 116 shears the tape by its contact with the projection 59² from the table 35. The knife 116 is connected to a vertically reciprocatable bar 118, held in elevated position by means of a spring 119 and a collar 120 secured thereto. A cam 121 depresses the knife 116 at the proper time and the spring 119 returns the bar 118 and the knife 116 as soon as its tape cutting function has been performed. The knife 116 severs the tape after the yielding presser feet 87' and 88' have been brought into contact with the blank and before the tape inserters 122 and 123 have been brought into contact with the tape. These tape inserters are secured to the head 83, on either side thereof as shown in Fig. 17, and move with the head. They are somewhat shorter than the presser feet and therefore the presser feet will make contact with the blank before the threaders 122 and 123 will be brought in touch therewith. The threaders are each notched as shown in Fig. 20, each tapered edge being somewhat sharp so as to readily perforate the blank. They are tapered inwardly so as not to tear or injure the blank and for the purpose of directing the tape through the perforations made thereby. The threaders are located, as shown in Fig. 20 immediately above the tape, the tape being severed a short distance from either side of the respective threader. When the threaders are passed through the blanks the tape ends are carried therewith and said ends remain on the opposite side of the blank when the threaders are withdrawn. When the head 83 is raised the presser feet 87 and 88, by virtue of the springs 90 remain in contact with the blank until after the threaders 122 and 123 have been withdrawn and the projecting ledges 59² around the channel 58 prevent the longitudinal edges of the blank from rising out of the channel in which the blank is contained. The threaders 122 and 123 pass into openings or depressions 124 made in the body portion of the table 35 and the ends of the tape are carried into these openings.

While the blank is being taped, in the manner heretofore described, other portions of it are having glue applied thereto by an instrumentality which I will now point out, (Fig. 16): Secured to the table 35 is an angularly disposed bracket 125 carrying a fixed head 125'. Secured in this head is a reciprocatable head 126 having glue-applying feet 127 and 128 on each side of its vertical axis. The movable head is provided with a rack 129 which may be attached thereto, or may be a part thereof, adapted for geared relation with a gear segment 130 oscillatable upon a shaft 131 which finds bearing in the bracket 124 as more clearly shown in Fig. 2. The gear segment 130 is oscillatable on the shaft 131 by means of an arm 132. Secured to the shaft 39 is a cam 133, which may be an integral part of the shaft 139, if desired, and a coöperating rectangular cam portion 134 connected by a rod 135 to the arm 132 so that as the shaft 139 is rotated the rod 135 will be vertically reciprocated and the movable head 126 will be correspondingly reciprocated in the guiding stationary head 125. The cam 133 and its coacting strap or housing 134, is so fashioned as to permit a dwell between the reciprocations of the vertically reciprocatable head 126 substantially in the manner heretofore described in connection with other cams of similar character, so that when the head 126 is depressed it remains for some time in a depressed position and when it is raised it remains in its raised position but it never dwells in any intermediate position. The cam, for performing this function, is more clearly shown in Fig. 22. When the head 126 occupies its raised position the glue-applying feet 127 and 128 are in the path of a roller 136 connected to a reciprocatable rod 137. As the roller 136 passes under the feet 127 and 128, being charged with the glue or other pastey material, it evenly distributes the material, with which it is charged, upon the lower surfaces of the said feet. A glue or paste receptacle 138 is secured below the reciprocating rod 137 and contains a glue distributing roller 139 secured to the shaft 140 which is rotated from the shaft 42 by means of the chain 141 and the sprocket gear wheels 142 and 143. An adjustable scraper 144 bears against the distributing roller 129 to vary the amount of glue that may adhere to the said roller. The quantity of glue permitted to adhere to the distributing roller 139 will be determined by the distance that the scraper 144 is maintained from contact with the said roller and this adjustment may be effected by means of the screws 145 and 146, the scraper 144 being pivoted, as at 147, the raising or lowering of the outer end of the said scraper will determine the distance of separation and the screws will maintain that distance fixedly.

Loose on the shaft 131 is an arm 150 secured to a geared segment 151. This segment has geared relation with the rack 137 that reciprocates the glue applying roller 136. An arm 152, pivoted as in 153, carries a roller 154 on its free end and bears upon a cam 155 that is driven by the shaft 39. The arm 152 is connected to the arm 150 by means of a rod 156 and a spring 157 normally holds the roller 154 upon the cam. When the cam 155 is rotated the arm 152 is moved in a substantially vertical direction for the purpose of moving the arm 150, and thereby the segmental rack 151 to reciprocate the rod 137, from the position shown in full lines in Fig. 16 to the position shown in dotted lines, thereby applying glue to the under surfaces of the feet 127, 128 of the vertically reciprocatable head 126. Between the glue applying feet 127, 128 in the head 126 is a presser foot 159 which is connected to a stem 158 that passes upwardly above the head and is deflected as at 159' to provide an abutment for a pivoted lever 160. A similarly deflected part 161 is secured to the stationary head 125 and extends a little beyond the same plane with the end portions 159' and overlies the other end of the pivoted lever 160. The stem 158 carries a spring 162 which holds the foot 159 in downward position as shown in dotted lines in Fig. 16 or below the active surfaces of the glue applying feet 127, 128 when the head is moved downwardly from the position shown in Fig. 16. As soon as the head 126 is moved downwardly and the short end of the lever 160 is moved from contact with the projection 161 the spring 162 will cause the presser foot 159 to descend to a position below the glue applying feet 127, 128, and the presser foot 159 will be brought into contact with the upper surface of the blank therebelow to hold the blank in position when the glue applying feet are being withdrawn therefrom, thereby to prevent the blank from following the glue applying feet when the head 126 is again raised to vertical position, the short lever 160 serving to lift the head above the surfaces of the glue applying feet 127, 128 when the head is in its raised position to prevent application of glue thereto, in a manner clearly shown in Fig. 16. Located below the feet 127, 128 of the vertically moving head 146 is the cushion 163 which may be of any suitable yielding material such as felt or the like so as to provide a more or less responsive surface upon which the blank rests at the time when the glue applying feet are brought into contact with the upper surface thereof.

The glue is applied to the blank, by the instrumentality just described, at the same time that the tape is threaded through the proper portions thereof, the said operations taking place on different parts of the blank, that is to say, there is no glue applied to that portion of the blank through which the tape is threaded and therefore these operations may be simultaneously performed, and while these operations are taking place certain parts of the mechanism are held stationary while other portions are being moved to perform the desired operations as the result of the peculiar formation of the cams and other parts, to which reference has heretofore been made. After these operations have taken place upon the blank, it is carried forward by the ear 51 upon the feed bar 47 and is caught by the folding apparatus. Upon the return of the feed bar the ear 51 will pass under the freshly inserted blank, which has been moved to position by ear 50, before the taping and gluing mechanism has made contact therewith ready to feed said blank when prepared to the folding mechanism which I will now describe.

Two vertically extending standards 200 and 201 are secured to the base 31 by means of cap screws 202. These standards are properly spaced apart to permit the inclusion of the blank folding apparatus therebetween. Bearings 203 and 204 are provided in the upper ends of the said standards for a shaft 205.

An electric motor 206 is shown as a means for driving the power machine. This motor is shown directly connected to the shaft 205 but intermediate gearing may be employed if it is necessary in order to secure the correct speed of said shaft or other means for driving the machine may be used.

Secured to the standards 200 and 201 are fixed cam rings 207, 208, respectively, as by means of bolts 209 said cam rings being provided with cam channels 210, 211 in their respective confronting faces.

Blank folding mechanism, rotatable with the shaft 205 comprises a hub 212 secured to said shaft by the key 213. Radially extending from the hub are a plurality of hollow forming mandrel arms 214, said mandrel arms being substantially alike in every particular. The ends of the mandrels are rectangular and tapered, as at 215, around which to fold the blank to form the pail. The mandrels are hollow, as at 216, for a purpose to be hereafter described. The hub 212 contains a cavity 217 communicating with a centrally disposed tube 218 one of which is inclosed within each of the mandrels.

Located upon the upper surface of the mandrel 215, when the mandrel is in position to receive the blank as shown in Fig. 1, is a finger arm 219, pivoted, as at 220, and held in raised position by means of a spring 221 and depressed by the short end 222 of the finger 219 bearing upon an enlarged portion 223 of the cam 208. The short end 222 of the finger carries a roller 224 which, when it bears against the surface 223 of the cam 208 causes the extended end 225 of said finger to be pressed downwardly to engage the blank 59 in the position in which it has been presented to the folding apparatus by means of the feed bar 47. A stop 226 is provided on the mandrel as a gage to which the forward edge of the blank is to be fed. The mandrels 215 are rotated in the direction shown by the arrow 228 in Fig. 1, and in the position shown one of the mandrels has just received a blank 59. As soon as this mandrel has been moved so that the roller 224 engages the large part 223 of the cam 208, the extended end 225 of the finger 219 will be depressed downwardly into engagement with the blank 59 by the operation of the cam so as to hold the blank firmly in contact with the forming mandrel during the time that the blank is being folded.

Pivoted to the mandrel arm 214 is an arm 229 carrying on its free end a folding head 230 having an end plate 231 with inwardly projecting lugs 232 on its sides. These lugs are to form the corners around the angle of the forming head and the longitudinal projection 233, on each side of the head, perform the same function on the blank where the upper side joins the two vertical sides thereof.

As a blank 59 is presented to the head the end-laps $59^l$ are ladened with glue and afterward are bent downwardly by means of fingers 234, which are bifurcated, as at 235, so as to contact with minimum surface of said glue bearing parts. There is one finger, 234, on each side of the head 230 secured thereto as by means of screws, as each side $59^l$ of the blank is to be bent downwardly at the same time. The projecting lugs 232 operate to fold over the parts $59^f$ of the blank after the part $59^l$ has been placed in proper position with reference to the mandrel by the fingers 234.

Mounted upon the head 230 is a downturned, axially movable, arm 237 carrying a roller 238 and having an inturned part 239. This arm is supported in bearings 240 on the said head and is held outwardly by means of a spring 241 bearing against the inner head, the inner end bearing against the washer 242, secured to the said arm. Now when this arm, as shown in Fig. 8, is moved inwardly the projection 239 will come in contact with the part $59^a$ of the blank and said part, which is shown in dotted lines to be vertically disposed in Fig. 8, is moved thereby to a position nearer the mandrel 215, the further movement of this portion of a blank being effected by the lower head, 243.

The arm 229 bearing the upper head 230, is pivoted to the mandrel arm 214 as at 244, upon supports 245. The lower end of the arm 229 terminates in a gear segment 246, having geared relation with a longitudinally movable rack 247. This rack is a part of the axially movable rod 248, having bearings in the slot 249 made in the sides of said mandrel arm. The rod 248 fits loosely in the slot 249, so as to be easily reciprocated therein and is secured to blocks 250 within the interior of the hollow mandrel, as by means of screws 251, to prevent lateral displacement of the rod. When the rod 248 is moved inwardly and outwardly it is manifest that the head 230 will be lowered and raised thereby accordingly. The rod carries a roller 252, on its inner end, said roller is contained in the cam channel 211 of the cam ring 208. Now it is evident that when a given arm 214, carrying the forming mandrel 215, moves upwardly in the direction of the arrow 228, as shown in Fig. 1, from the position which it occupied when the blank 59 was presented to it, that the rod 248 will be moved inwardly by means of the roller 252 in the cam channel 211, and when the rod 248 is moved inwardly it causes the rack 247, connected to the end thereof, to move the geared segment 246 in such way as to bring the head 230 down into contact with its forming mandrel 215 and thereby to downwardly fold the end flaps $59^l$ of the blank and the bottom part $59^g$ and when the end plate 231 is brought into place the end tabs $59^f$ are folded over on top of the glued surfaces $59^l$, the upper surface of the tabs $59^f$ also bearing glue. While the head 230 is down, in operative position referred to, the arm 237 is pressed inwardly by contact of the roller 238 with the projecting stationary tongue 253, which is within the path of the said roller, and the said roller is held in this position while it is traveling from the point 254 to 255 of the said tongue. As heretofore stated the effect of the inward pressure of this arm 237 is to cause the projection 239 to deflect the part 59ᵃ upwardly, to place the blank in proper position for contact with the lower forming head 243.

Secured to the lower surface of each of the arms 214, which bear the forming mandrels 215 is an arm 256 pivoted, as at 257, to the rotating arm 214 and which carries on its outer end a forming head 243. The major portion of the forming head consists of the wall part 258 and angularly disposed integral wall parts 259 and 260. Slidable in the walls 259 and 260 are jaws 261 and 262 for intimate contact with the blank of which the pail is to be constructed. These jaws are slidable in the walls 259 and 260 upon stems 263 and 264, respectively. These stems each carry a head 266, respectively in each of which is a roller 267 freely rotatable upon the axis 268, the heads being yieldingly pressed outwardly by springs 269.

A gear segment 270 joins the arm 256 at or near the pivotal point 257. The segment 270 has geared relation with a rack 271 which is an extended part of the reciprocatable rod 272. This rod bears on its inner end a roller 273 that is contained in the cam channel 210 of the cam ring 207. When the rod 272 is pushed outwardly the lower folding head 243 is moved upwardly into position shown in full lines in Fig. 10, its extended or open position being shown in dotted lines in the same figure. In its upward movement the jaws 261 and 262 are brought into contact with the parts 59ʰ of the blank and said parts are folded upwardly after which the jaws 261 and 262 are pushed inwardly until the various interlapped portions of the blank, being glue laden, are pressed firmly with considerable pressure into contact relation by means now about to be described.

Just about the time the roller 238 leaves contact with the tongue 253, at point 255, the roller 252 of the reciprocatable rod 248 controlling the head 230, is pushed outwardly by the cam channel 211 as at 211′ and by this means the rack 247, being pushed outwardly, the head 230 is raised from contact with the blank and substantially simultaneously with this movement the roller 273, of the cam channel 210, which controls the lower folding head 243, is drawn inwardly by the part 210′ of said cam channel and the lower folding head 243 is thereby raised, and in raising, folds the parts 59ʰ, which have been previously deflected (together with side 59ᵃ) by the projection 239 on the arm 237, into intimate contact with its other members on the forming mandrel 215. The lower folding head is held in operative position with the forming mandrel, by the operation of the cam 211 in the manner heretofore described during the greater part of the succeeding revolution. As soon as an arm 214 arrives at a substantially vertical position the rollers 267, controlling the jaws 261 and 262 are brought into contact with two segmental cams 280 and 281, respectively, thereby forcing the jaws 261 and 262 into contact with the overlapped portions of the blank now formed into a pail, and the said portions of the pail are forcibly maintained in contact by these jaws, by the pressure exerted by said cams thereon. The jaws in the lower head 242 are held in operative position, with reference to the forming mandrel 215, during the time when the rotating arm 214 is between the stationary segmental cams and until the rollers have passed free from contact with said segmental cams. About the same time the cam roller, 273, has been pushed outwardly, by the portion 286 of the cam 211, thereby to cause the withdrawal of the head 243 from operative position, shown in full lines in Fig. 10, to inoperative position shown in dotted lines therein.

Curved projections 287 are secured to the upper surfaces of the laterally movable clamping jaws 261, 262, to pass under a portion of the head 230 and over the angular surface of the forming mandrel so that the friction, exerted between the rollers 267 and the coöperating cams 280 and 281, will not be sufficient to remove the lower forming head from its operative position.

After the pail has been formed, in the manner heretofore described, it becomes necessary to remove it from the forming mandrel and this I accomplish in an automatic manner by means of compressed air conveyed to the device through the conducting pipe 290, secured to standard 201, and adapted for communication with the interior of pipes 218, within the mandrel arms 214. Each of the arms is provided, in the hub 212, with a cavity 217 and a port 291 and the hub 212 is provided on its side face, near each cavity 217, with a lateral projection 292.

Secured on to the end of the air pipe 290 is a valve 293 comprising a disk 294 fixed to a hollow stem 295, in a block 296, that is screw threaded in the ends of the pipe 290. The upper end of the stem 295, is provided with a nut 297 against which a spring 298 abuts the other end of the spring finding support upon the block 296. By this means the disk 294 is yieldingly held in its most inward position. A port 299 is provided in the block 296 which port registers with a port 300 in the stem 295 so that when the disk is in the position shown in Fig. 5 the ports are closed but when the disk is in its most outward position the ports register and permit air to pass from the interior of the pipe 290 through the hollow stem 295 and out through an orifice 293 in the center of the disk 294. As the arms 214, of the forming mandrels, are rotated the ports 291 are brought into register with the central perforation 293 of the disk 294. Pivoted on the pin 305 at one side of the pipe 290 is a lever 302 carrying a roller 303 and a projecting arm 304 adapted to bear upon the inner surface of the disk 294. Now when the projection 292 on the hub 212, passes under the roller 303 the arm 304 is pushed against the disk and the disk is moved inwardly, against the resiliency of the spring 298, until the perforation 293 in the center of the disk is brought into register with the port 291 whereupon the ports 299 and 300 are brought into operative position with respect to each other and air is permitted to enter the chambers 291 and pass through the tube 218 which blows the completed pail from the forming mandrel 215 into the tube 306.

While a pail is being formed in the manner described another arm, of the rotating element, is passing around and in its turn receives another blank from the taping and pasting instrumentality and by this means the various functions on a plurality of pails are being performed by the pail forming mechanism.

The timing of the taping and pasting mechanism is such, with relation to the forming mechanism, that it is unnecessary to stop the movement of the forming mandrels when any one is in position to receive the blank, of which the pail is to be made. The movement of the feed bar 47 may be sufficiently rapid to pass the blank into the proper position with reference to the forming mandrel, without the necessity of stopping it, but if desired the rotating arms 214 carrying the forming mandrels 215, may be intermittently moved by any suitable mechanism.

Shaft 42 is driven by shaft 205 through the instrumentality of a pair of beveled gears 310 and 311 and a vertical shaft 312 and another pair of beveled gears 313 and 314. A bracket 315 supports the ends of the shaft 42 carrying the gear wheel 314 and brackets 316 and 317 afford bearing support for the vertical shaft 312.

When the completed pails are blown from the forming mandrels into the chute 306, in a manner heretofore described, they are placed in the chute in such manner as to be readily nested, one within the other, so that when they are received by the attendant they are in condition for immediate shipment.

The drawings show four rotating like mandrels but it is manifest that a greater or less number may be employed if desired.

Briefly to review the operation of the machine: Each blank, laid on carrier bar 57 in front of ear 50, when the carrier is at its rearward extreme of movement, is first moved forward to present the blank to the taper and paster mechanism, and on the return movement the ear 51 engages the blank ready to carry it forward to the feeder. During each dwell of the blank preceding a forward movement thereof the taping and pasting devices operate to apply the tape bail 59$^k$ and to coat the upper surfaces of flaps 59$^l$ and 59$^f$ with paste or glue. The bail application (Figs. 17, 18 and 20) is effected by the cam operated threaders 122, 123, after the tape 60, constantly being unspooled by the friction drives 65, 66, has been drawn across the path of the threaders by the reciprocating clamp 95, 103, and cut by knife 116 while the tape is clamped by the cam actuated bar 116'. The clamp 95, 103 is opened to receive the end of the tape by one cam actuated lever 105 and again opened to release the extremity of the tape by the other lever 105' at the opposite end of the travel of the clamp, but before the release of the tape occurs a proper amount of slack in the tape-span is drawn out by the raising of finger 110 by suitable cam mechanism. Simultaneously with the punching of the tape ends through the flaps 59$^h$, the feet 127, 128 glue-coated by the roller 136, descend upon the flaps 59$^l$ and 59$^f$, coating them with glue, the stripper 159 preventing the glued blank from sticking to the feet when the latter are raised. The blank, in the condition shown in Fig. 26, with its tape bail 59$^k$ in place and its flaps 59$^f$ and 59$^l$ coated with paste is then set forward by ear 51 on the bar 47 and its front edge is delivered to the mandrel 215, the rotation of the folding device being so timed that one of its mandrels is appropriately positioned to receive the blank. As the folding structure rotates clamp 219 grips the forward end of the blank upon the mandrel so that said blank is positively carried in rotation by the revolving mandrel arm. The blank lies on the mandrel with its flap 59$^e$ under the clamp 219 and its glued end of flap 59' projecting transversely beyond the mandrel. The stationary cam on the mandrel carrier immediately operates the first folding arm 229 (Fig. 7) which descends to the position shown in Fig. 8, bending down the bottom 59$^g$ of the blank over the end of the mandrel and down turning the pasted flaps 59$^l$ over the sides of the mandrel where they are held by fingers 235. Projections 232 force in the flaps 59$^f$ so that they lie over the glued flaps 59$^l$ to adhere thereto, and as soon as this is accomplished the sliding arm 237 crosses under the stationary cam 253 (Fig. 3) so that the active end 239 of the arm may bend up the side 59$^a$ of the blank against the under side of the mandrel. Then, as the rotating mandrel reaches the point (Fig. 3) where the cam slots 210' and 211' substantially coincide, arm 229 is caused to withdraw and arm 256 (Fig. 10) is caused to move from dotted line position to full line position. This folding head 243 bends up the unglued flaps 59$^h$ which carry the tape bail 59$^k$, so that they overlie the flaps 59$^i$ and 59$^f$. Then as the rotation continues rollers 267 of the clamping part 262 carried by said folder 243 (Fig. 15) pass in between the segmental cams 280 and 281, the clamps compress the glued interlapped flaps together against the resistance of the mandrel completing the formation of the pail as illustrated in Fig. 27. The arc of the cams 280 and 281 is made long enough so that adequate time is given to insure proper adhesion of the glued parts before the releasing action occurs. As the mandrel, carrying the now completed structure approaches a position where the mandrel stands vertically downward above the chute 306 (Fig. 3) the clamping head is moved back to open position and when the mandrel is directly above said chute the proper operation of an air valve causes an air jet to be projected through a tube 218 within the mandrel forcibly to blow the completed pail off of the mandrel end and into the chute 306, the successively delivered pails tending to nest one within the other as the result of this discharge.

While I have herein shown and described a single embodiment of my invention for the purpose of clear disclosure it is evident that changes may be made in the specific form and number of the various parts without departing from the spirit and scope of the appended claims.

Having described my invention, what I claim is:

1. An automatically operable pail making machine, comprising means for simultaneously pasting and bail-taping a blank; a plurality of movable means for appropriately folding the blank; means for moving said pasting and folding means in coöperative time relation and means for automatically passing said blank from the pasting and taping means to said folding means.

2. An automatically operable pail making machine, comprising means for simultaneously pasting and bail-taping a blank, receiving means for moving said blank to said pasting and taping means; a plurality of movable means for appropriately folding the blank; means for moving said taping, pasting and folding means in coöperative time relation and means for automaticaly passing said blanks from the pasting and taping means to said successive folding means.

3. An automatically operable pail making machine, comprising means for pasting a blank, perforating the same and inserting the ends of a bail through the said perforations; a plurality of means for appropriately folding the blank; means for moving said folding means in sequential order in proper time relation with said pasting and taping means and means for automatically passing said blank from the pasting and taping means to said folding means.

4. An automatically operable pail making machine, comprising means for pasting and taping a blank; a plurality of means for appropriately folding the blank; means for moving said folding means in sequential order in proper time relation with said pasting and taping means, means for automatically passing said blank from the pasting and taping means to said folding means, and means for blowing said finished pails from said folding means and placing them in nested relation.

5. An automatically operable pail making machine, comprising means for pasting and taping a blank; means for appropriately folding the blank to arrange adhesive-receiving parts in interlapped relation, means for passing said blank from said pasting and taping means to said folding means and means for applying pressure to said interlapped parts.

6. An automatically operable pail making machine, comprising means for pasting and taping a blank; means for conveying said blank to the point of delivery of said pail and for appropriately folding the blank while in transit to arrange the adhesive receiving parts in interlapped relation; means for passing said blank from said pasting and taping means to said folding means and means for applying pressure to said interlapped parts after the blank has been folded and while it is in motion.

7. An automatically operable pail making machine, comprising means for pasting and taping a blank; means for conveying said blank to the point of delivery of said pail and for appropriately folding the blank while in transit to arrange the adhesive receiving parts in interlapped relation; means for passing said blank from said pasting and taping means to said folding means, means for applying pressure to said interlapped parts after the blank has been folded and while it is in motion, and means for removing the finished pail from the folding and conveying means when it arrives at said point of delivery.

8. An automatically operable pail making machine, comprising means for simultaneously pasting a blank, perforating the same and inserting the ends of a bail through the said perforations; means for subsequently folding said blank; means for presenting said blank to said pasting and taping means and for subsequently presenting it to said folding means and means for moving said instrumentalities in proper time relation.

9. An automatically operable pail making machine, comprising means for applying an adhesive to parts of a blank to be subsequently interlapped; means for passing a tape through said blank to leave the ends thereof on the opposite side of the blank to be included between the pasted and interlapped parts to secure the tape thereto, and means for appropriately folding the said blank to form a pail.

10. An automatically operable pail making machine, comprising means for applying an adhesive to parts of a blank to be subsequently interlapped; tape threaders adapted to pass the ends of the tape through the blanks; means for moving the tape, to form a bail, across said blank and across the path of said threaders; means for severing said tape in proper lengths to form the bail; and means for appropriately folding the said blank to form a pail, with the ends of the bail included between the interlapping pasted parts.

11. An automatically operable pail making machine, comprising a blank receiving table; means for positioning a blank thereon; a pair of tape threaders adapted to perforate said blank and to pass the ends of the tape therethrough; means for moving said tape across said blank and across the path of said threaders; means to increase the length of the tape over the blank by drawing it progressively in its direction of travel after the first mentioned tape moving means has been stopped; means for severing said tape after being so moved, and means for moving said threaders to perforate said blank and insert the ends of the tape.

12. An automatically operable pail making machine, comprising a blank receiving table; means for positioning a blank thereon; tape threaders one on each side thereof adapted to perforate said blank and to pass the ends of the tape therethrough; means for moving a tape, to form a bail, across said blank and across the path of said threaders; means to increase the length of tape between said points of blank perforation; means for securing said tape after being so moved; means for moving said threaders to perforate said blank; means for applying adhesive material to portions of the blank to be interlapped and means for appropriately folding said blank.

13. In an automatically operable pail making machine, a taping mechanism comprising a movable head carrying a yielding presser foot to retain the blank in place; tape inserting means, or threaders, for passing the ends of the tape through the blank movable into contact therewith after engagement of said presser foot and movable therefrom before withdrawal of said presser foot; means for passing said tape across said blank and under said threaders; another means located between said threaders to draw the tape progressively in its direction of travel and increase its length between the points of perforation; a knife to sever said tape and means to move said instrumentalities in proper time relation.

14. In an automatically operable pail making machine, a taping mechanism comprising a movable head carrying a yielding presser foot to retain the blank in place; tape inserting means, or threaders, for passing the ends of the tape through the blank movable into contact therewith after engagement of said presser foot and movable therefrom before withdrawal of said presser foot; means for passing said tape across said blank and under said threaders; means operating to draw the tape in its direction of travel and increase its length between the points of perforation after movement of the first mentioned tape moving means has ceased; a knife to sever said tape; means to hold said tape while being severed by said knife and means to move said instrumentalities in proper time relation.

15. In an automatically operable pail making machine, providing means for pasting and taping a blank and means for passing the blank therefrom to a folder, in combination with a folder comprising a folding head around which to fold the blank; blank forming means operable by the movement of said head and means for moving said head in time relation with the movement of said blank passing means.

16. In an automatically operable pail making machine, providing means for pasting and taping a blank and means for passing the blank therefrom to a folder, in combination with a folder comprising a plurality of folding heads around each of which to fold a blank; blank folding means operable by the movement of the head structure and means for moving said structure in time relation with the movement of said blank passing means so that each head in its turn will be placed in blank receiving position to receive a blank from said passing means.

17. In an automatically operable pail making machine, providing means for pasting and taping a blank and means for passing the blank therefrom to a folder, in combination with a folder comprising a plurality of folding heads around each of which to fold a blank; blank folding means carried by each of said heads and operable by the movement of the head structure and means for moving said head structure in time relation with the movement of said blank passing means so that each head in its turn will be placed in blank receiving position to receive a blank from the said passing means.

18. In an automatically operable pail making machine, providing means for pasting and taping a blank and means for passing the blank therefrom to a folder in combination with a rotatable blank-folding structure comprising a plurality of radially disposed arms, each arm carrying a head around which to fold a blank; blank folding members carried by each head and relatively stationary means coöperating with said moving head to actuate said folding members.

19. In an automatically operable pail making machine, the combination of a rotatable blank folding structure comprising a plurality of radially disposed arms, each arm carrying a head around which to fold a blank; blank folding members carried by each arm and relatively stationary radially disposed means in the plane of said arms cooperating with said moving arms to actuate said folding members.

20. In an automatically operable pail making machine, the combination of a moving blank-folding structure comprising a plurality of radially disposed arms the ends of which form heads around which to fold a blank; blank folding means carried by each arm and relatively stationary radially disposed means coöperating with said moving arms to actuate said folding means, and arranged in the plane of said arms.

21. In an automatically operable pail making machine, the combination of a continuously movable blank folding structure; a plurality of pail forming heads carried thereby; arms carrying folding jaws for coöperation with each said head, carried by said structure; relatively stationary means for moving said jaws to fold a blank and to open said jaws to release said pail and pneumatic means to blow the finished pail from the heads.

22. In an automatically operable pail making machine, the combination of a movable blank folding structure; a plurality of pail-forming heads carried thereby; folding jaws for coöperation with said head, carried by said structure, means for actuating said jaws to fold the blank and stationary segmental cams coöperating with the folders for applying pressure to the interlapped parts of said blank, operable while said structure is in motion.

23. In an automatically operable pail making machine, the combination of a rotatable structure; a plurality of pail-forming heads carried thereby; radial arms carrying folding jaws for coöperation with each said head carried by said structure; cams between said head and the axis of said structure for actuating said jaws to fold the blank and to open said jaws to release the finished pail, and a cam radially beyond the heads for coöperation with the folding jaws to fold the blank.

24. An automatically operable pail making machine, comprising means for pasting a blank; movable means operable in time relation to the pasting means for folding the blank; means for passing said blank from said pasting to said folding means; pneumatic means completely independent for discharging the blank from the folding means and means actuated by the folding means for momentarily operating said pneumatic means.

25. An automatically operable pail making machine, comprising means for preparing a blank; means for passing the blank therefrom to a folder, in combination with a rotatable folder comprising a structure carrying a plurality of folding heads around each of which to fold a blank; blank folding means supported on and carried by said structure, operable by movement of said structure and relatively stationary cams located in the plane in which said folder revolves to move said folding means.

26. In a machine of the character described, blank taping and blank pasting mechanisms adapted and arranged to operate simultaneously on a pail-forming blank; mechanism to fold the blank to include the tape ends between the interlapped adhesive-bearing parts, and means for actuating said mechanisms in timed relation.

27. In a machine of the character described, a blank folding structure constantly rotatable on a horizontal axis, comprising a plurality of heads, around each of which to form a blank; pivoted folding jaws, carried by the structure; means to operate said jaws, to fold the blank, during part of the revolution of said structure; means to release the folded blank from said heads, and means to apply pressure to the interlapped adhesive-bearing blank after folding and before releasing the blank.

28. In a machine of the character described, a blank folding structure for constant rotation on a horizontal axis, comprising a plurality of heads, around each of which to fold a blank; pivoted folding jaws for coöperation with each head, carried by the structure; relatively stationary cams, located between said heads and the axis of the structure; radially disposed rods connecting said cams and jaws to fold the blank while the structure is in motion; pressure-applying plates, one on each side of the rotatable structure, and movable walls, within one said jaw structure, for each head, for engagement with said plates to thereby apply pressure to the interlapped parts of said blank, when folded.

29. In a machine of the character described; means for preparing a blank to be folded; a movable folding mechanism, comprising a plurality of heads, around each of which to fold a blank; means for folding the blanks around each head; means to pass a blank from the blank preparing means to the respective heads, as said heads are consecutively presented thereto; a stop on each said head to position the blank thereon, and a finger, carried by each head, to hold the blank in contact therewith until the jaws have acted to fold the blank.

In testimony whereof I hereunto set my hand in the presence of two witnesses.

FRANK J. BRUNELL.

In the presence of—
 FORÉE BAIN,
 MARY F. ALLEN.

Copies of this patent may be obtained for five cents each, by addressing the "Commissioner of Patents, Washington, D. C."